US008250244B2

(12) United States Patent
Deforche et al.

(10) Patent No.: US 8,250,244 B2
(45) Date of Patent: Aug. 21, 2012

(54) WIRELESS MODEM DEVICE USABLE ON COMPUTER DEVICE WITHOUT DRIVER INSTALLATION WHEREIN COMPUTER HAS A PROXY SERVER APPLICATION AND PRE-INSTALLED GENERIC DRIVERS

(75) Inventors: Koen Deforche, Kessel-Lo (BE); Wim Dumon, Saint-Josse-ten-Noode (BE); Juan Bernabeu, Brussels (BE); Jan Vercruysse, Blanden (BE)

(73) Assignee: InterDigital Patent Holdings, Inc., Wilmington, DE (US)

(*) Notice: Subject to any disclaimer, the term of this patent is extended or adjusted under 35 U.S.C. 154(b) by 181 days.

(21) Appl. No.: 12/419,101

(22) Filed: Apr. 6, 2009

(65) Prior Publication Data

US 2010/0064063 A1 Mar. 11, 2010

(30) Foreign Application Priority Data

Apr. 4, 2008 (EP) .................................... 08154116
Oct. 9, 2008 (EP) .................................... 08166258

(51) Int. Cl.
*G06F 3/00* (2006.01)
*G06F 13/12* (2006.01)
(52) U.S. Cl. ......... 710/8; 710/7; 710/9; 710/10; 710/19; 710/36; 710/62; 713/1; 713/2; 713/185
(58) Field of Classification Search ................ 710/7–10, 710/19, 36, 41, 62–64; 713/1, 2, 185
See application file for complete search history.

(56) References Cited

U.S. PATENT DOCUMENTS

| | | | |
|---|---|---|---|
| 5,826,027 A | | 10/1998 | Pedersen |
| 6,754,725 B1 * | | 6/2004 | Wright et al. ..................... 710/8 |
| 6,986,038 B1 * | | 1/2006 | Leah et al. ..................... 713/155 |
| 7,239,877 B2 * | | 7/2007 | Corneille et al. ........... 455/456.3 |
| 7,299,422 B2 * | | 11/2007 | Levine et al. .................. 715/789 |
| 7,506,148 B2 * | | 3/2009 | Zhang et al. ....................... 713/1 |
| 7,620,667 B2 * | | 11/2009 | Rollin et al. ........... 707/999.204 |
| 7,865,878 B2 * | | 1/2011 | Weiner et al. .................. 717/122 |
| 2004/0098596 A1 * | | 5/2004 | Elteto et al. .................... 713/185 |

(Continued)

OTHER PUBLICATIONS

Wikipedia.org, "Portable TOR," Mar. 26, 2008, http://en.wikipedia.org/w/index.php?title=Portable_Tor&oldid=200960394.

(Continued)

*Primary Examiner* — Tammara Peyton
(74) *Attorney, Agent, or Firm* — Volpe and Koenig, P.C.

(57) ABSTRACT

Method for connecting a host computer device to a wireless communication network, the host computer device being provided with an operating system with at least one pre-installed generic driver providing a generic communication protocol (7) for communication between the host computer device and a standard class of computer peripheral devices other than wireless modem devices, the method comprising the steps of: (a) connecting a wireless modem device to the host computer device; (b) setting up, by means of a pre-installed generic driver of the operating system on the computer device, a modem/host communication interface (6) for communication between the wireless modem device and the computer device; (c) connecting the host computer device to a wireless communication network via the wireless modem device; (d) routing data traffic (8-9) between the host computer device and the wireless communication network over the modem/host communication interface (6). The generic communication protocol (7) is used in the modem/host communication interface (6) for transferring the data traffic (8-9) between the host computer device and the wireless modem device.

10 Claims, 5 Drawing Sheets

U.S. PATENT DOCUMENTS

2004/0202126 A1* 10/2004 Leung et al. .................. 370/331
2007/0214187 A1* 9/2007 Thomas et al. ............... 707/200
2008/0126584 A1* 5/2008 Mullis et al. ...................... 710/7

OTHER PUBLICATIONS

Wikipedia.org, "List of portable software 1-14 applications," Apr. 3, 2008, http://en.wikipedia.org/w/index.php?title=List_of_portable_software&oldid=203004313#proxy_server.2Fclients_and_Routing_Netowrks.

"Review of Franklin CDU680 aka Sprint U680 EVDO USP Modem," Sep. 20, 2007, http://www.evdoinfo.com/content/view/2106/63.

Wikipedia.org, "Portable application," Apr. 3, 2008, http://en.wikipedia.org/w/index.php?title=Portable_application&oldid=203000117.

Wikipedia.org, "Universal Serial Bus," Mar. 31, 2008, http://en.wikipedia.org/w/index.php?title=Universal_Serial_Bus&oldid=202232936.

Wikipedia.org, "Tunneling Protocol," Apr. 2, 2008, http://en.wikipedia.org/w/index.php?title=Tunneling_protocol&oldid=203016479.

* cited by examiner

WIRELESS MODEM DEVICE USABLE ON COMPUTER DEVICE WITHOUT DRIVER INSTALLATION WHEREIN COMPUTER HAS A PROXY SERVER APPLICATION AND PRE-INSTALLED GENERIC DRIVERS

TECHNICAL FIELD

The present invention relates to a wireless modem device connectable to a computer device and a method for operating said wireless modem.

BACKGROUND ART

Today, when a wireless modem is connected for the first time to a computer device, installation of an appropriate driver is required before applications running on the computer device can use the functionality of the wireless modem to connect to wireless networks.

It is a disadvantage of existing wireless modem devices that users cannot use them on a foreign computer device, which may for example be a computer device in a hotel or on an airport, on which the user has no administrator rights and installation of the appropriate driver is not allowed.

DISCLOSURE OF THE INVENTION

It is an aim of the present invention to provide a wireless modem device and a method for operating same, with which the need for installation of an appropriate driver can be avoided.

This aim is achieved according to the invention with the method and device of the independent claims.

As used herein, with "wireless modem device" is intended to mean a computer peripheral device which has an electronic interface for connection to a complementary electronic interface of a computer device (host) and which comprises electronic components for establishing communication between said computer device to which it is connected and a remote device over a wireless communication network.

The electronic interface can for example be a USB interface, a firewire interface, a PCI express interface, a PCMCIA interface or any other electronic interface known to the person skilled in the art.

The wireless communication network can be WLAN, GSM, GPRS, UMTS, EDGE, HSUPA, HSDPA, 3G, 3.5G, 4G or any other wireless communication network known to the person skilled in the art. In preferred embodiments, the wireless modem device of the invention can have electronic components for communicating over two or more different wireless communication networks.

In the connection method and the wireless modem device of the invention, a pre-installed generic driver of an operating system installed on the computer device is used for setting up a modem/host communication interface by means of which the wireless modem device and the computer device can communicate with each other. Data traffic from the computer device towards the wireless communication network and vice versa is routed over this modem/host communication interface and uses the generic communication protocol provided by the pre-installed generic driver. This has the advantage that the need for a specific driver for the communication between the wireless modem device and the computer device can be avoided. This has the advantage that a user can use the wireless modem device on a computer device on which he has no administrator rights, i.e. a computer device on which his user rights are restricted so that he cannot install a specific driver for the wireless modem device, for example a computer device in a hotel, on an airport and the like.

As used herein, by "pre-installed generic driver" is intended to mean a driver which is installed on the computer device along with the installation of the operating system, i.e. a driver which is standard for the operating system and which is capable of driving a standard class of computer peripheral devices connected to the computer device without requiring installation of a specific driver for such a computer peripheral device. An example of such a generic driver is a human interface driver (HID), which has predetermined software components configured for driving a human interface device such as a mouse, a keyboard or other. Another example of such a generic driver is a mass storage device (MSD) driver, which has predetermined software components configured for driving mass storage devices such as USB memory sticks, external hard drives, or more generally readable and writable computer peripheral memory devices. HID and MSD drivers are known per se in the art an therefore need not be described in detail herein.

In the method and device of the invention, one of the pre-installed generic drivers of the operating system on the computer device is exploited for setting up the modem/host communication interface, i.e. the generic driver is used in connection with a computer peripheral device for which it is not actually intended. In other words, the wireless modem device of the invention does not belong to the standard class of computer peripheral devices for which the generic driver is foreseen in the operating system. Nevertheless, it has been found according to the invention that the wireless modem device can communicate with the computer device by using the generic communication protocol provided by the generic driver over the modem/host communication interface. In particular, the generic communication protocol is used as the lower layer communication protocol for exchanging information between the wireless modem device and the computer device, such as for example AT commands or IP data.

In preferred embodiments, the wireless modem device of the invention uses a proprietary protocol stack (e.g. a proprietary TCP/IP stack) rather than a kernel protocol stack (e.g. a kernel TCP/IP stack) which is otherwise generally used by the operating system and any applications running under the operating system on the computer device for any network communication.

In preferred embodiments, the proprietary protocol stack is preferably set up on the computer device, although in alternative embodiments the proprietary protocol stack may also be set up on the wireless modem device.

In preferred embodiments, the wireless modem device of the invention uses a proxy to move data traffic from the kernel protocol stack to the proprietary protocol stack, i.e. to indicate to running applications that network communication is to be performed using the proprietary protocol stack set up by the wireless modem device rather than the kernel protocol stack.

In preferred embodiments, the wireless modem device stores at least one application and is provided for launching said application as a portable application, meaning that the application keeps its data (cache) in the memory of the wireless modem device and no traces are left on the computer device. The application can for example be a web browser application, a document viewer application for viewing a.o. downloaded documents, or other. The web browser application preferably has predefined settings, such that it is configured to make use of the proxy server application with embedded proprietary protocol stack for connecting to the internet.

The above mentioned features of the wireless modem device and its operation method contribute to the advantage that any modification to settings in the kernel protocol stack or in the operating system can be avoided, or more in general that any traces on the computer device can be avoided, so that upon disconnecting the wireless modem device from the computer device, it is as if it has never been used on the computer device. As used herein, this effect is termed a "zero footprint", i.e. the wireless modem device leaves no trace or a "zero footprint" on the computer device.

In preferred embodiments of the device of the invention, software code portions are stored on the wireless modem device or on a separate memory device (e.g. a micro SD card) connectable to the wireless modem device, which are configured for performing one or more of the above mentioned steps, i.e. the use of a pre-installed generic driver, the setting up of a proprietary protocol stack, the use of a proxy, etc. The software code portions are preferably stored in a read only partition.

In preferred embodiments of the method for operating the wireless modem device of the invention, the method comprises one or more of the following steps: (a) upon connection of the wireless modem device to a computer device, checking if a specific driver for the wireless modem device is present on the computer device; (b) if not, using the pre-installed generic driver of the operating system on the computer device for communication between the wireless modem device and the computer device; (c) setting up the proprietary protocol stack for establishing network communication between applications running on the computer device and the wireless communication network via the wireless modem device; (d) using the proxy to move data traffic from the kernel protocol stack to the proprietary protocol stack; (e) launching applications stored on the wireless modem device as portable applications.

The invention more generally relates to a method for connecting a computer device to a communication network, the host computer device being provided with an operating system using a kernel protocol stack to connect to a pool of first communication networks known to an administrator of the computer device, the method comprising the step of introducing a second protocol stack, aside from the kernel protocol stack, for connecting the computer device to a second communication network outside not belonging to the known pool of first communication networks. This may comprise the step of adding a tunnelling protocol to the second protocol stack without mediation of the administrator. Preferably, the second protocol stack is introduced by running a proxy server application with predefined connection parameters on the computer device, the proxy server application redirecting data traffic between the computer device and the second communication network from the kernel protocol stack to the second protocol stack.

BRIEF DESCRIPTION OF THE DRAWINGS

The invention will be further elucidated by means of the following description and the appended drawings.

MODES FOR CARRYING OUT THE INVENTION

Figure 1:
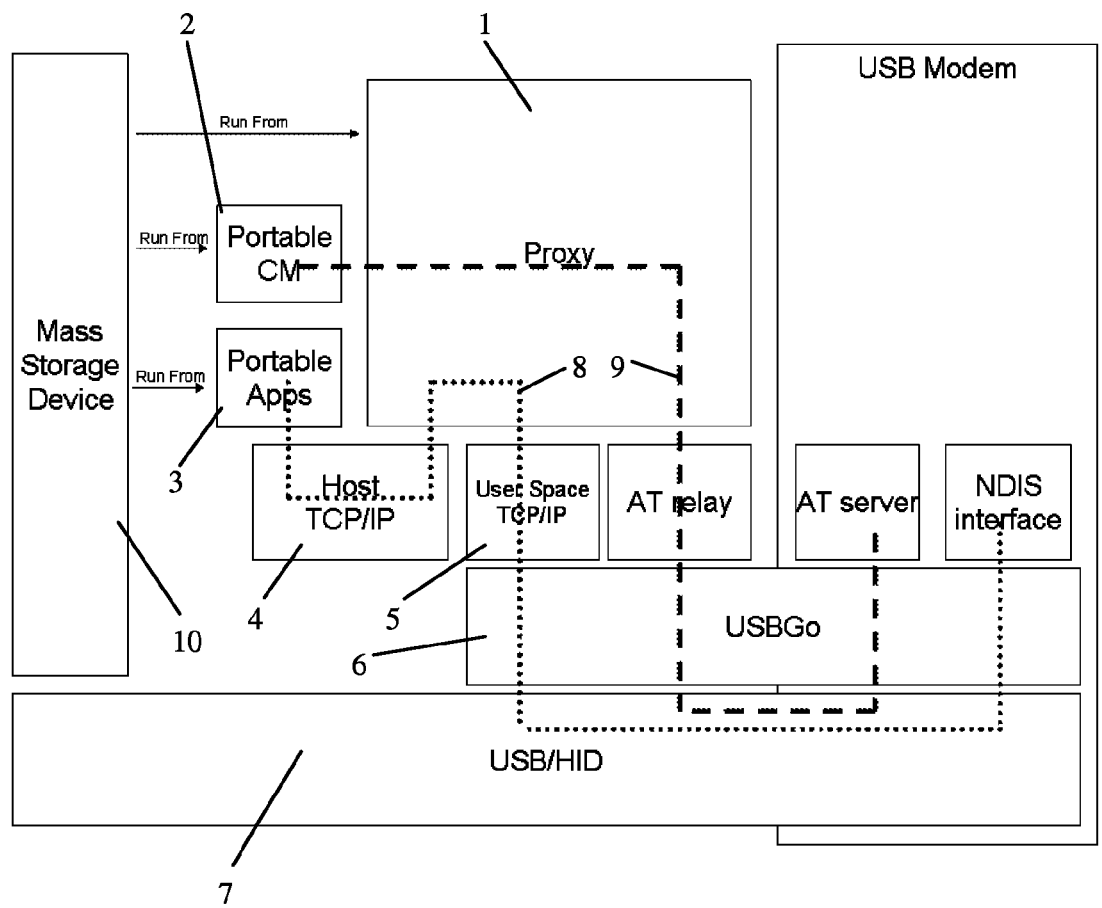
FIG. 1 shows a general view with the main components of a preferred embodiment of the invention.

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

1. Introduction

Problem Definition: to provide a way to achieve USB (or other interface) modem functionality in any computer (Operating system independent) without leaving a footprint (Zero-Footprint). This means that the need can be avoided to install drivers and/or applications on PC's to give USB modem connectivity. This also means that the need can be avoided for the end user to have administrator rights on the computer. An advantage is the ease of use of e.g. USB modem products which can even be allowed usage in restricted conditions. The invention can give the end user connectivity on any personal computer (PC) without interfering on the PC itself.

A preferred solution according to the invention is to combine existing standard methods found in current Operating Systems (OS) to achieve the Zero Footprint objective. The concepts involved in this preferred solution are:

Use of existing USB class drivers
Use of a user space TCP/IP stack
Use of a proxy between kernel and user space TCP/IP stack
Use of portable applications running from a mass storage device.

Usually, the user needs to install proprietary drivers before he/she can use a USB network device. These drivers present a network/modem interface (+some other control interfaces) to the OS. In some OSes (i.e. Linux and Mac OS X), it is possible to use existing USB class drivers (e.g. USB CDC ACM and USB CDC Ethernet) already present in the OS but Windows OSes require some extra files and administrator rights to use these network class drivers. To avoid this, we propose to use other USB class drivers, not exhibiting a network/modem interface but supported without any extra installation in all OSes. The challenge is then to reroute network requests/answers from/to the applications. The normal flow would be to reroute the network request/packet at the bottom of the TCP/IP stack by creating a new network interface which would take packets from/to the TCP/IP stack and transfer them to the network device. But this creation of network interface requires administrator rights and thus is not possible for a full Zero Footprint concept which is aimed at in this preferred embodiment of the invention. In order to achieve this aim, a proprietary TCP/IP stack, running in user space, is used instead of the standard one available in host OSes. This enables to tune the proprietary TCP/IP stack to use the chosen USB class driver without requiring administrator rights. Standard network applications are built using the Socket interface and dynamic library which would then link it to the standard TCP/IP stack available on the OSes. According to this preferred embodiment of the invention they are linked to the proprietary TCP/IP stack and thus, for avoiding to have to modify/recompile the applications, preferably a Proxy is used which routes the information from the local host interface, connected to the host OS TCP/IP stack, to the proprietary stack. The applications are preferably modified by the configuration of a Proxy. The applications are preferably launched from the mass storage device as portable applications, which can avoid that any traces are left on the host OS.

A preferred implementation is discussed below, named the "ZeroFootprint solution".

2. Technical Overview 2.1. Introduction

Figure 2:
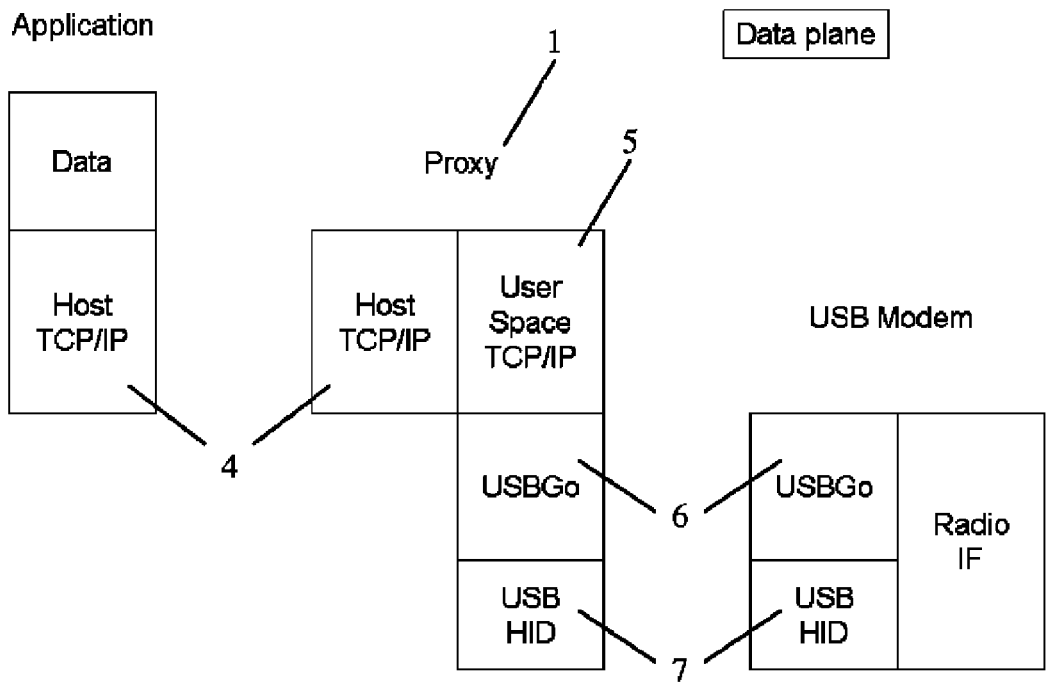
FIGS. 2 and 3 respectively show separate views of the data plane and the control plane of the embodiment of FIG. 1.
Figure 3:
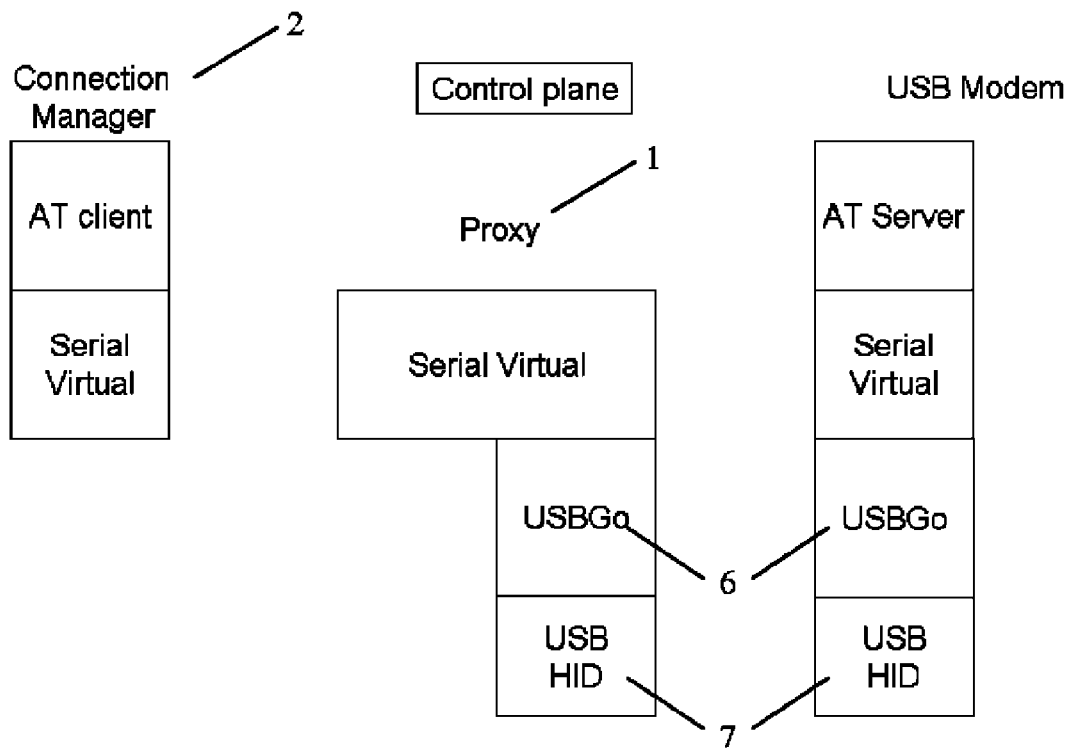

A general view with the main interfaces exposed is shown in FIG. 1. From a protocol point of view, FIGS. 2 and 3 give a separate view of respectively the data plane and the control plane.

The ZeroFootprint solution is based on mainly 5 elements:
a host/modem interface ("USBGo" 6) using the USB/HID protocol (7) to transport AT data (9) and IP data (8);
an external TCP/IP stack (5) configured to send IP data through the above mentioned USB/HID channel (7);
a TCP/IP proxy (1) configured to translate host TCP/IP stack (4) into external TCP/IP stack (5);
a Connection Manager ("CM" 2) able to open a connection through the interface provided by the proxy;
a program launcher and portable applications (3), a.o. a web browser application.

2.2 Generic Description/Use Case

1. The user plugs the USB modem (below also referred to as "the modem device". At this point, the modem presents itself as a USB modem with VID/PID. Additionally, this solution builds on top of one of the default (non network) USB HID device class drivers available in the most common OS (Windows XP, Vista, Mac OSX and Linux). At this point, there are two alternatives on how the OS can react. If the USB modem drivers have not been installed, the OS recognizes the device as a MSD+HID generic device (the device is configured for presenting itself this way) and therefore loads those drivers. Alternativelly, the USB modem drivers might have been installed, and then these drivers will handle the device. But let's concentrate on the 'nomadic' mode, in which OS generic drivers are used. At this point, the USB modem presents itself as a USB Mass Storage Device (10) presenting a CD Rom (exposing flash memory), a Generic Volume (exposing microSD) and a 3rd Generic Device to transport control and TCP/IP data between the host OS and the USB modem. Immediately after this configuration is shown in the OS, and now assuming a Windows OS, the CD Rom has an autorun that launches a launcher in which the user has the possibility to launch amongst other applications a web browser (e.g. Firefox) and a Connection Manager (CM). This launcher is based on portable application principles, as it is also done with other applications.

2. The user starts the Connection Manager and starts a connection. The Connection Manager opens a serial virtual port (interface provided by a proxy running from the modem device) to be able to send AT commands and therefore opening a packet data protocol (PDP).

3. When the connection is established using AT commands, a PDP is created and the network will return a set of IP configuration parameters. These network parameters are passed to a proprietary proxy server that contains an embedded TCP/IP stack that is adapted to work with the USB HID interface to pass IP and control data. This proxy sits also on top of the standard windows sockets to be able to listen to incoming request to the localhost (see following step).

4. The user starts the webbrowser and opens a site (e.g. http://www.google.com). This webbrowser is configured to use the previously mentioned proxy on the localhost. When the proxy receives the request, it will use the second proprietary interface (with the embedded TCP/IP stack) to transmit/receive data to/from the network.

2.3 USB 2.3.1 USB Endpoints and Switching Mechanism

Preferably, the ZeroFootprint capable devices offer the capabilities to work in dual mode, meaning that ZeroFootprint functionality can be used when no drivers are installed, and Standard (legacy) functionality can be used when drivers are installed. In the two cases, different USB endpoint structures are used.

A switching mechanism allows a ZeroFootprint device to present itself as a USB/HID+MSD device or USB modem device, depending on the availability of drivers in the system. The USB device can thus expose its USB interface in different ways: (1) A composite device with USB HID and USM Mass Storage Unit (UMS) device with UMS and HID USB ID; (2) UMS device with 3G USB ID.

2.3.2 USBGo Interface

The USBGo interface is the interface enabling communication between the USB modem and the computer. The USBGo uses USB-HID as a lower layer to avoid having to install a specific driver for the modem.

The USBGo interface supports multiple channels, so that separate channels can be used for control data and user data. A flow control mechanism allows any endpoint of the USBGo interface to stop/restart data in a given channel, in case that it cannot handle the amount of data received. The flow control mechanism can be relatively simple as it is only used for the data channel(s). The control channel is used to send enable/disable frames for a given data channel.

In this way, the USBGo interface is tuned and optimized to allow transferring data with a minimum guaranteed speed between modem device and host computer and transferring data in packages on an event driven base. It optimises the USB resources (for instance the available bandwidth of the "USB/HID") and the power consumption on the USB physical layer.

2.4 Mass Storage Devices

The ZeroFootprint concept doesn't impose any special requirements on the storage used. The concept provides a virtual CD ROM concept, i.e. a certain amount of read only memory (64 MB) is available to the OS when the modem device is inserted for first time and drivers have not been installed previously. This storage device is presented as a CD-ROM that contains an executable with the drivers/connection manager installer. The concept further provides memory in the form of microSD. This microSD is presented as a mass storage device.

The CD-ROM memory part is used to have a permanent copy of the basic applications needed (i.e. launcher, proxy and CM) (+specific drivers installer). Therefore, any configuration file needed by the launcher, proxy or CM is stored/modified on the writable storage device (i.e. microSD). To do so, these applications look for the driver on which the configuration is available. This can be achieved differently in the different OSes. In Windows, the two USB storage devices are under the same USB device (device manager). In Linux and MacOS X: On Unix based OS, the USB mass storage devices can be found under/dev/sdX.

2.6 TCP/IP Stack

The host OS TCP/IP stack is used whenever the specific USB modem drivers are installed.

The proprietary TCP/IP stack used in the ZeroFootprint mode to bridge between the host OS TCP/IP stack and the USB/HID interface created to send data.

2.7 Proxy

2.7.1 General

Proxy is started at the beginning (from the launcher or any other method). As default configuration, it is using the standard OS TCP/IP stack, and will change to use the external TCP/IP stack whenever notified by the CM. For example, the proxy can restart itself using a different stack when the CM requests the change.

2.7.2 Interface CM-Proxy

To be able to send AT commands and configure the external TCP/IP protocol for the USB/HID interface, the proxy exposes an interface to 3rd party applications. This interface resembles a serial interface.

A possible flow diagram is the following (precondition— no drivers installed):

1. User inserts modem device
2. CD autolaunch launches Launcher
3. Launcher launches proxy
4. Proxy starts according to default configuration
  a. Default host TCP/IP stack
5. Proxy starts to listen for client request (virtual serial port)
6. User launches Connection Manager
7. CM connects to Proxy
8. Proxy returns OK (Restarting)
9. Proxy restarts using USB/HID (external TCP/IP) interface
10. CM reconnects to proxy and starts to send AT commands
11. (...)
12. User stops connection
13. CM closes connection with Proxy
14. Proxy returns OK (Restarting)
15. Proxy restarts using default host OS TCP/IP

2.8 Programs Launcher

The Program Launcher (launcher from now on) is responsible to provide an interface for the user to be able to launch the applications residing in the memory of the USB modem, and allow the modification of some basic settings. The launcher can be based on the functionality already provided by other 3rd party launchers.

For the launcher to recognise the list of programs available in the USB memory, the list is preferably generated dynamically. For doing that, the applications are copied into the modem device following a certain structure, and information related to the application and how it's shown in the launcher is made available.

2.9 Connection Manager

The CM listens for various insertion events and the queries the current list of devices. It looks for VID/PID and compares with its internal database.

2.10 Portable Applications

It is preferred to use portable applications which run from the modem device without the need to install anything on the host (ideally, also no registry change is allowed). For applications to be able to run on the ZeroFootprint mode, support for communication with the proxy is provided.

3. Flow Diagram

Figure 4A:
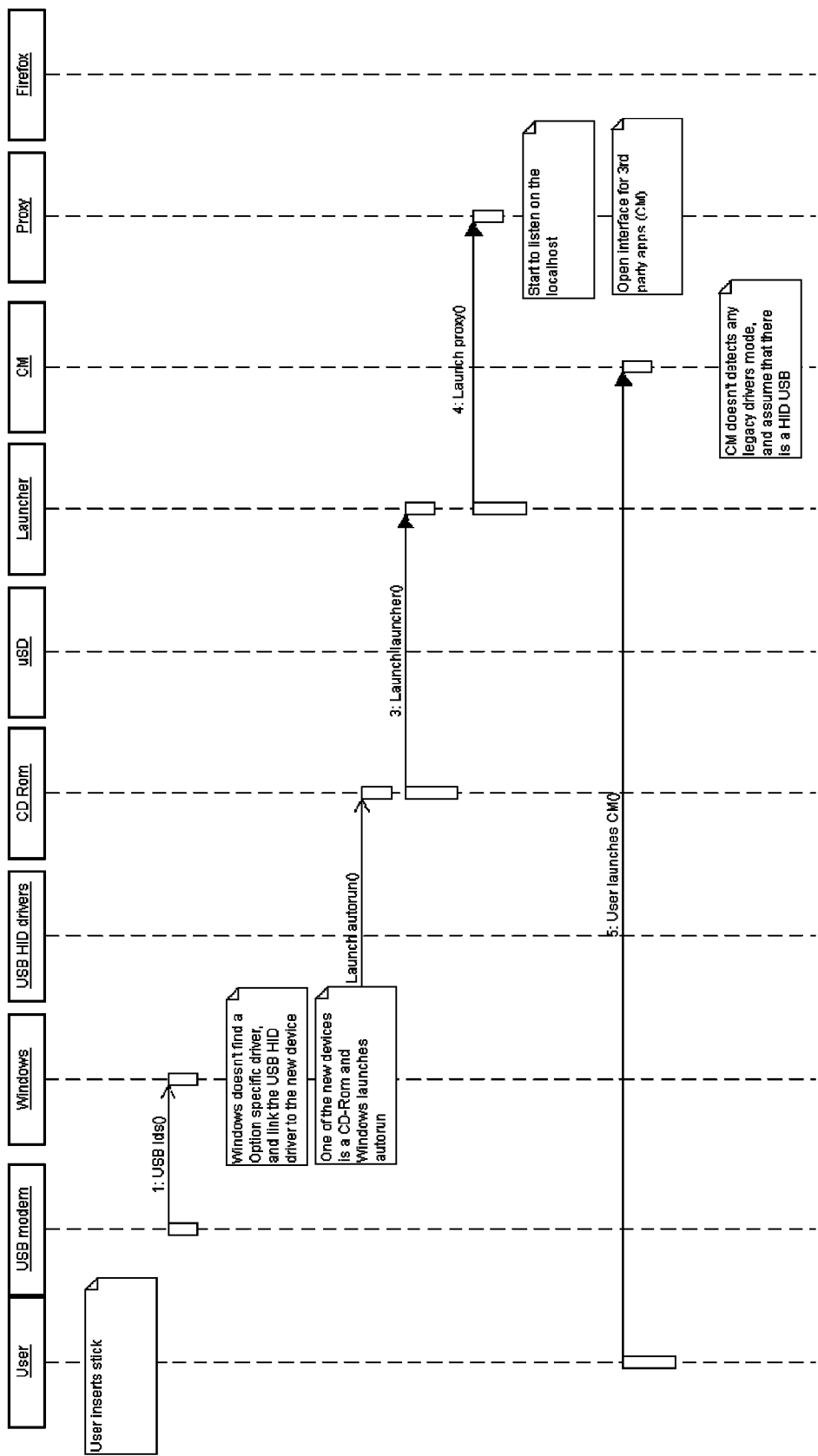
FIG. 4 shows a possible flow diagram for a preferred embodiment of the invention.
Figure 4B:
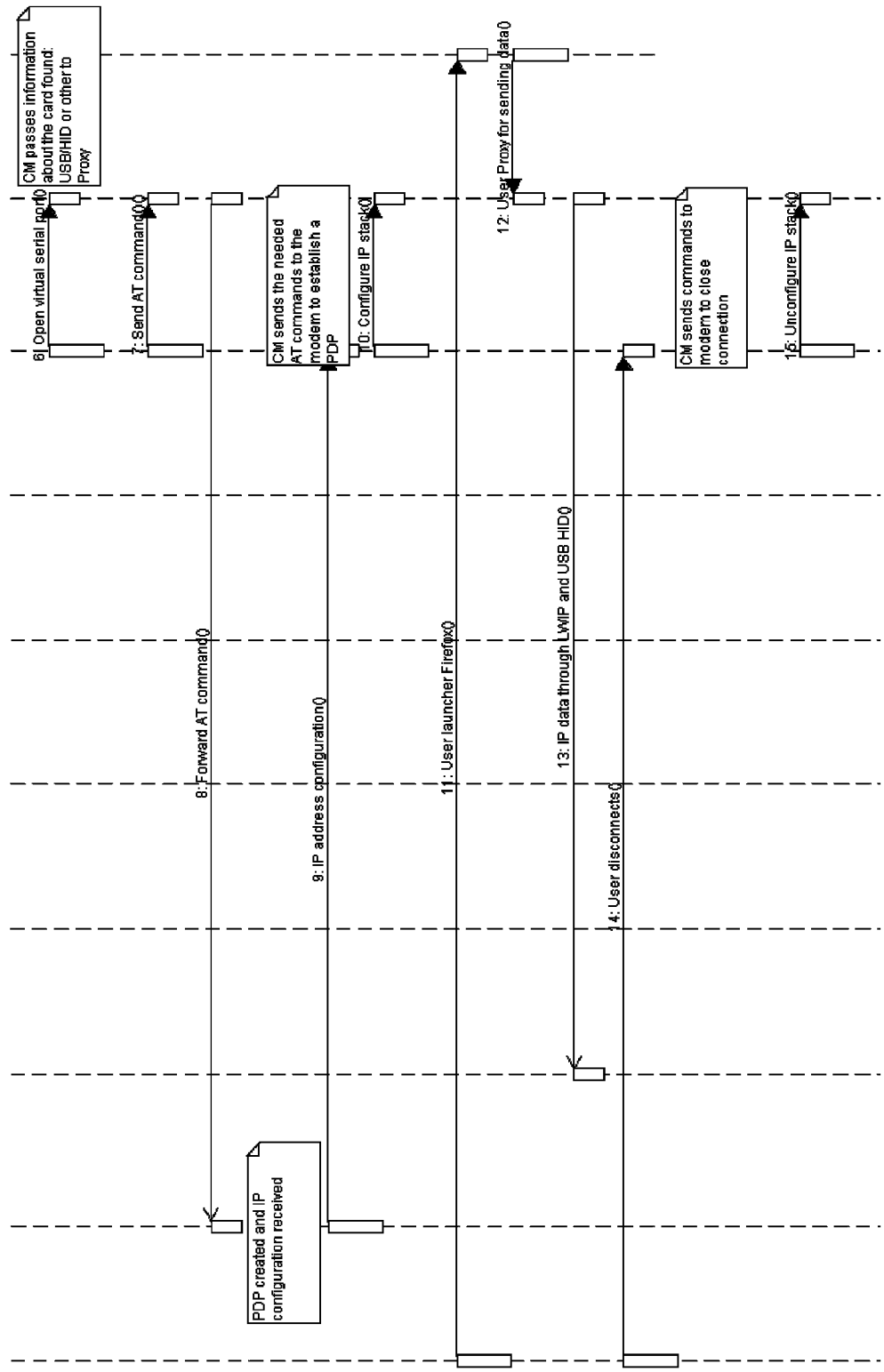
Figure 4C:
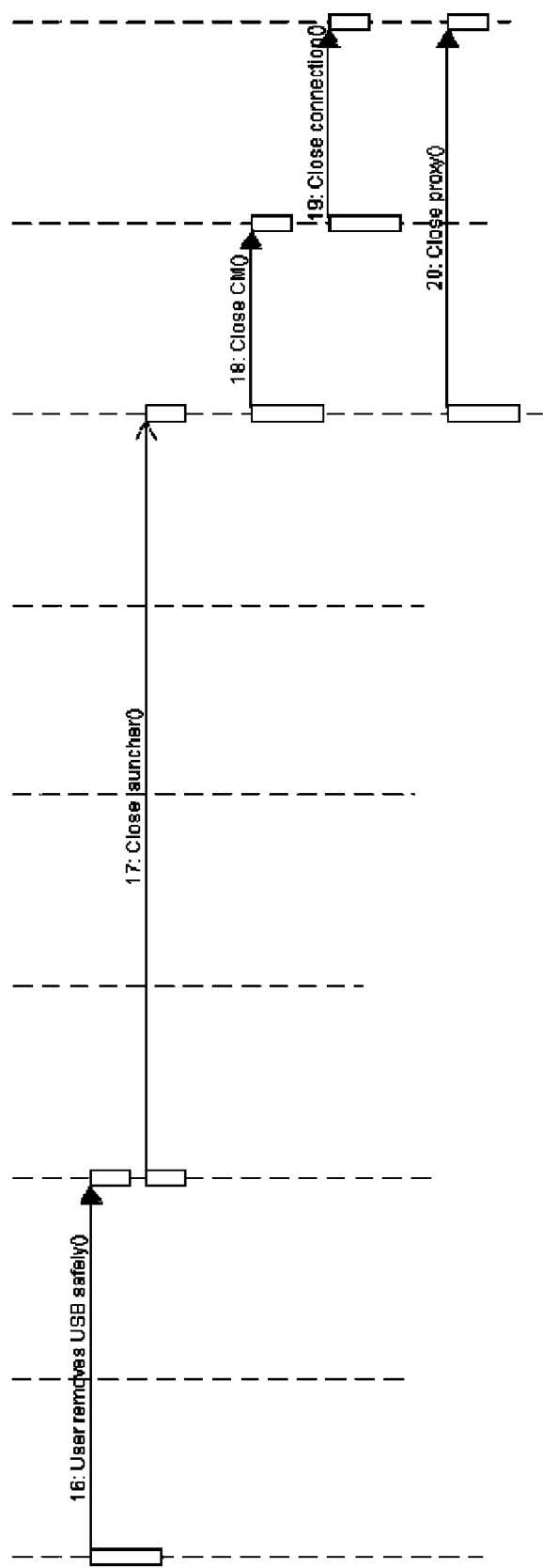

Another basic flow using the ZeroFootprint (USB/HID) concept is shown in FIG. 4.

The user inserts the modem device ("stick"). The following steps are performed.

1: The OS ("Windows") looks for a device specific driver and finds none. The OS links the USB/HID driver to the modem device.
2: Part of the memory on the modem device is presented as a CD-ROM. The OS launches "autorun" is the same way as it is commonly done when an OS detects a CD-ROM.
3: Calling autorun launches the Program Launcher.
4: The Launcher launches the proxy server application (provided on the modem device), which starts to listen on the localhost for incoming client requests. The proxy provides an open interface for $3^{rd}$ party applications, such as the Connection Manager (CM).
5: The user launches the CM (provided on the modem device). The CM does not detect any legacy driver mode and assumes that the driver mode using USB/HID is active.
6: The CM opens a virtual serial port. The CM passes information about the modem device found to the Proxy.
7: The CM sends AT command to the proxy.
8: The proxy forwards the AT command (over the USB/HID interface) to the modem device, which performs the step for creating a PDP and receiving an IP configuration (these steps are well known in the art and therefore need not be described in detail here).
9: The modem device passes the IP configuration on to the CM, which sends AT commands to the modem device to establish the PDP.
10: The CM asks the proxy to configure the external TCP/IP stack.
11: The user launches a web browser application (e.g. modified version of Firefox).
12: The web browser application is preconfigured to use the external TCP/IP stack provided by the proxy.
13: IP data is exchanged between the modem device and the proxy through the external TCP/IP stack ("LWIP") and the USB/HID interface.
14: The user disconnects, using the CM, which sends commands to the modem device to close the connection.
15: The CM tells the proxy to unconfigure the IP stack.
16: The user safely removes the modem device from the host, which triggers the modem device to close the launcher (step 17), which closes the CM (step 18), which tells the proxy to close the connection (step 19) and subsequently closes the proxy (step 20).

4. Alternative Embodiments

The principles of the embodiment described above can also be used in the following alternative embodiments of the invention, namely to connect a computer device to a second (wireless or non-wireless) communication network which does not belong to a pool of first (wireless or non-wireless) communication networks known to an administrator of the computer device. In a similar way as described above, a second protocol stack can be introduced next to the kernel protocol stack provided by the OS on the computer, to allow applications running on the computer device to get outbound connection to the second communication network. In a similar way as described above, a proxy server application with predefined connection parameters for using the second communication network can be used to tell the applications to redirect data traffic between the computer device and the second communication network from the kernel protocol stack to the second protocol stack.

In alternative embodiments, a tunnelling protocol stack, such as for example IPSEC, can be added to the second protocol stack (or also the proprietary protocol stack for the wireless modem device described above), for establishing secure networking sessions. Likewise, this does not require mediation of the administrator.

The invention claimed is:

1. A method for connecting a host computer device to a wireless communication network, the host computer device being provided with an operating system with at least one pre-installed generic driver providing a generic communication protocol for communication between the host computer device and a standard class of computer peripheral devices other than wireless modem devices, the method comprising:
   connecting a wireless modem device to the host computer device;
   setting up, by means of the pre-installed generic driver of the operating system, a modem/host communication interface for communication between the wireless modem device and the computer device;
   connecting the host computer device to a wireless communication network via the wireless modem device; and
   routing data traffic between the host computer device and the wireless communication network over the modem/host communication interface, wherein the generic communication protocol is used in the modem/host communication interface for transferring the data traffic between the host computer device and the wireless modem device, and
   wherein a proxy server application with predefined connection parameters is stored on the wireless modem device and the connecting the host computer device to a wireless communication network via the wireless modem device comprises running the proxy server application, the proxy server application comprising an embedded proprietary protocol stack for the routing the data traffic between the host computer device and the wireless communication network over the modem/host communication interface.

2. The method according to claim 1, wherein the setting up comprises presenting the wireless modem device to the host computer device as a human interface device and wherein the pre-installed generic driver is a human interface device driver.

3. The method according to claim 1, wherein the setting up comprises presenting the wireless modem device to the host computer device as a mass storage device and wherein the pre-installed generic driver is a mass storage device driver.

4. The method according to claim 1, wherein the proxy server application is run on the host computer device.

5. The method according to claim 1, wherein the proxy server application is run on the wireless modem device.

6. The method according to claim 1, wherein a web browser application with predefined settings is stored on the wireless modem device and wherein the method further comprises the step of running the web browser application as a portable application on the wireless modem device.

7. A computer peripheral wireless modem device for providing wireless connectivity to a host computer device which is provided with an operating system with at least one pre-installed generic driver providing a generic communication protocol for communication between the host computer device and a standard class of computer peripheral devices other than wireless modem devices, the wireless modem device comprising a memory in which computer executable software code is stored, said computer executable software code comprising:
   a first software code portion for setting up, by means of the preinstalled generic driver of the operating system, a modem/host communication interface for communication between the wireless modem device and the computer device; a second software code portion for connecting the host computer device to a wireless communication network via the wireless modem device, second software code portion comprising a proxy server application with predefined connection parameters, the proxy server application comprising an embedded proprietary protocol stack; and
   a third software code portion for routing data traffic between the host computer device and the wireless communication network over the modem/host communication interface via the embedded proprietary protocol stack;
   wherein the first software code portion uses the generic communication protocol in the modem/host communication interface for transferring the data traffic between the host computer device and the wireless modem device.

8. The computer peripheral wireless modem device according to claim 7, wherein the first software code portion presents the wireless modem device to the host computer device as a human interface device and wherein the pre-installed generic driver is a human interface device driver.

9. The computer peripheral wireless modem device according to claim 7, wherein the first software code portion presents the wireless modem device to the host computer device as a mass storage device and wherein the pre-installed generic driver is a mass storage device driver.

10. The computer peripheral wireless modem device according to claim 7, wherein said computer executable software code comprises a web browser application with predefined settings which is provided for being run as a portable application on the wireless modem device.

* * * * *